US009956980B2

(12) United States Patent
Nygren et al.

(10) Patent No.: US 9,956,980 B2
(45) Date of Patent: May 1, 2018

(54) JUVENILE STROLLER WITH REMOVABLE SEAT COVER

(71) Applicant: Dorel Juvenile Group, Inc., Foxboro, MA (US)

(72) Inventors: Kurt Nygren, Harvard, MA (US); Joseph D. Langley, Boston, MA (US); Walter S. Bezaniuk, Berkley, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days. days.

(21) Appl. No.: 15/343,409

(22) Filed: Nov. 4, 2016

(65) Prior Publication Data

US 2017/0120942 A1 May 4, 2017

Related U.S. Application Data

(60) Provisional application No. 62/250,559, filed on Nov. 4, 2015.

(51) Int. Cl.
B62B 9/12 (2006.01)
B62B 9/24 (2006.01)
B62B 9/10 (2006.01)

(52) U.S. Cl.
CPC ............... *B62B 9/12* (2013.01); *B62B 9/108* (2013.01); *B62B 9/24* (2013.01)

(58) Field of Classification Search
CPC  B62B 9/12; B62B 9/102; B62B 9/108; B62B 9/24; B62B 9/28; B60N 2/2881
USPC .................. 280/47.4, 33.993, 647, 657, 658; 297/219.12
See application file for complete search history.

(56) References Cited

U.S. PATENT DOCUMENTS

| 4,536,028 | A | * | 8/1985 | Jones | ..................... A47C 31/11 297/224 |
| 5,954,404 | A | * | 9/1999 | Suzuki | ..................... B62B 9/10 280/647 |
| 5,964,502 | A | * | 10/1999 | Stephens | .............. B60N 2/2812 297/250.1 |
| 6,543,847 | B2 | * | 4/2003 | Balensiefer | ............ A47D 13/02 297/250.1 |
| 7,537,284 | B1 | * | 5/2009 | Antorcha | ............. B60N 2/2881 297/219.12 |
| 7,568,762 | B2 | * | 8/2009 | Paulson | ................... B60N 2/28 297/219.12 |
| 7,677,661 | B1 | * | 3/2010 | Ferrari-Cicero | ..... B60N 2/2812 297/219.12 |
| 7,735,919 | B2 | * | 6/2010 | Chen | .................... B60N 2/2812 297/250.1 |
| 8,382,201 | B2 | * | 2/2013 | Mills | .................... A47D 15/006 297/219.12 |
| 8,991,854 | B2 | | 3/2015 | Greger et al. | |
| 9,278,631 | B2 | * | 3/2016 | Ferraro | ................ B60N 2/2812 |
| 9,308,929 | B1 | | 4/2016 | Dowd et al. | |
| 9,463,822 | B2 | | 10/2016 | Sundberg et al. | |
| 2008/0136231 | A1 | * | 6/2008 | Doherty | ............... B60N 2/2881 297/219.12 |
| 2015/0130243 | A1 | | 5/2015 | Varney et al. | |
| 2015/0197268 | A1 | | 7/2015 | Dowd et al. | |

* cited by examiner

*Primary Examiner* — John D Walters
(74) *Attorney, Agent, or Firm* — Barnes & Thornburg LLP

(57) ABSTRACT

A stroller in accordance with the present disclosure includes a rolling frame and a juvenile seat coupled to the rolling frame. A seat cover is coupled to a seat bottom and back of the juvenile seat.

5 Claims, 12 Drawing Sheets

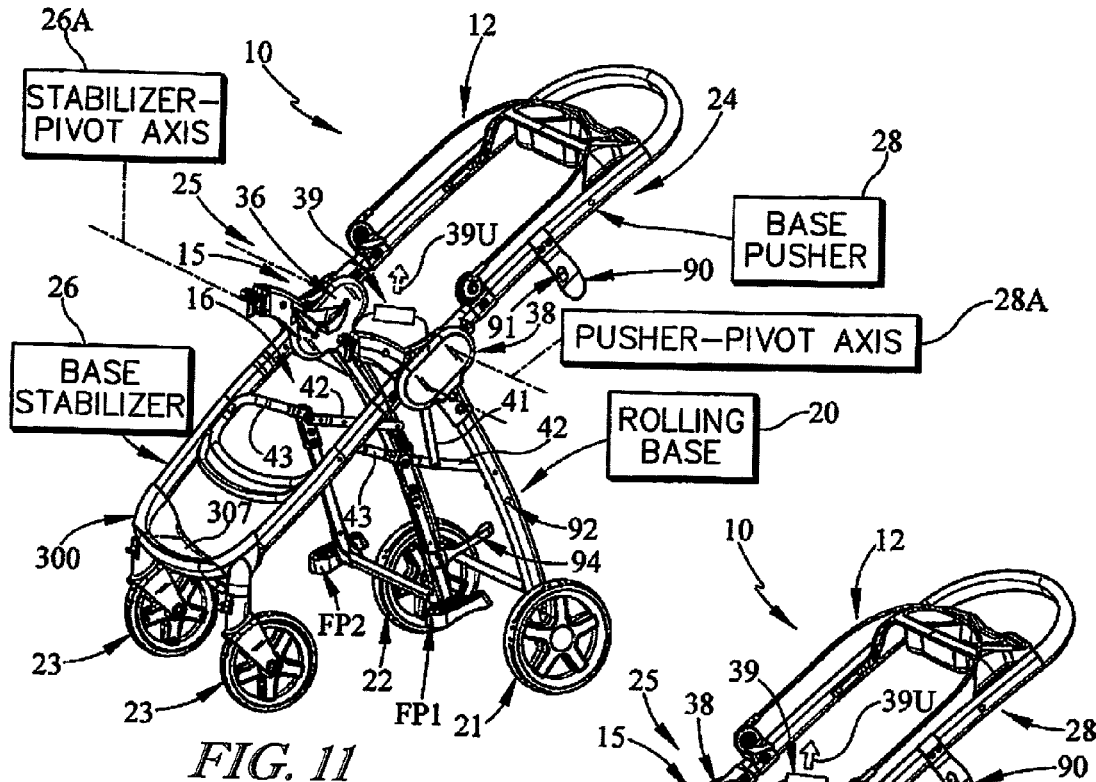
FIG. 11
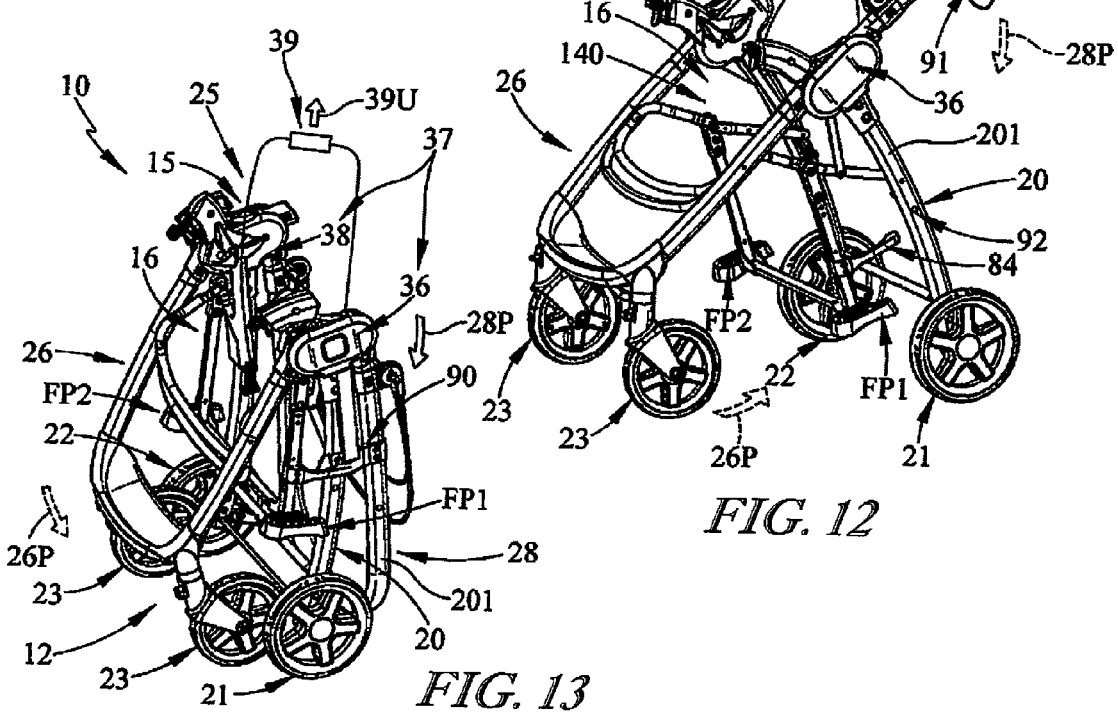
FIG. 12
FIG. 13

JUVENILE STROLLER WITH REMOVABLE SEAT COVER

PRIORITY CLAIM

This application claims priority under 35 U.S.C. § 119(e) to U.S. Provisional Application No. 62/250,559, filed Nov. 4, 2015, which is expressly incorporated by reference herein.

BACKGROUND

The present disclosure relates to juvenile strollers and in particular to a juvenile seat including a rolling frame and a juvenile seat coupled to the rolling frame for rolling movement therewith. More particularly, the present disclosure relates to a seat cover that is adapted to cover a seat bottom and a seat back included in the juvenile seat.

SUMMARY

In accordance with the present disclosure, a juvenile stroller includes a juvenile seat mounted on a mobile cart having a push handle. The juvenile seat includes a seat bottom and a seat back extending upwardly from the seat bottom.

In illustrative embodiments, the juvenile stroller further includes a footrest coupled to the mobile cart and arranged to lie below the seat bottom. The juvenile seat also includes an inclined leg support coupled to a forward edge of the seat bottom and arranged to extend downwardly toward the footrest. The inclined leg support has a downwardly extending free end that terminates at a laterally extending lower edge that is arranged to lie above and in spaced-apart relation to the footrest that is mounted on the rolling frame to provide a space therebetween.

In illustrative embodiments, the juvenile stroller further includes a removable seat cover comprising a seat-back pad, a leg-support pad, and a seat-bottom pad arranged to interconnect the seat-back and leg-support pads. The seat-back pad includes a backrest adapted to mate with a companion backrest included in the seat back of the juvenile seat and several rearwardly facing hook-and-loop fasteners configured to mate with companion forwardly facing hook-and-loop fasteners coupled to the backrest of the juvenile seat to retain the seat-back pad on the juvenile seat. The leg-support pad includes a leg-rest panel and a rear sheet coupled to the leg-rest panel and arranged to cooperate with an underside of the leg-rest panel to form pocket means for receiving the free end of the inclined leg support included in the juvenile seat therein to retain the seat-bottom pad on the seat bottom and the leg-support pad on the leg support.

In illustrative embodiments, the juvenile stroller further includes a child-restraint harness comprising a crotch belt coupled to the seat bottom and first and second side belts coupled to the backrest of the seat back. The first and second side belts are configured to be passed through belt-receiving apertures formed in the seat-back backrest and the seat-pad backrest and then engaged to the crotch belt to restrain a child seated in the juvenile seat.

In illustrative embodiments, a lower end of each of the first and second side belts is coupled to a forwardly facing surface of the seat-back backrest. An upper end of each of the first and second side belts is passed first through a companion belt-receiving aperture formed in the seat-pad backrest and then through a companion belt-receiving aperture formed in the seat-back backrest so that a backrest-anchor plate included in a free end of each side belt engages a rearwardly facing surface of the seat-back backrest to anchor those free ends to the seat back of the juvenile seat.

In an illustrative process in accordance with the present disclosure, the removable seat cover can be removed from the juvenile seat by a caregiver for cleaning after (1) disengagement of the side belts from the crotch belt, and (2) separation of the crotch belt from the seat-bottom pad and separation of each side belt first from the seat-back backrest and then from the seat-pad backrest, (3) forward movement of the seat-pad backrest away from the seat-back backrest to unmate the rearwardly facing hook-and-loop fasteners on the seat-pad backrest from the forwardly facing hook-and-loop fasteners on the seat-back backrest, and (4) upward movement of the leg-support pad relative to the inclined leg support of the juvenile seat to remove the inclined leg support from the upwardly opening pocket means formed in the leg-support pad. The crotch belt is separated from the seat-bottom pad by passing an upper free end of the crotch belt downwardly through a belt-receiving aperture formed in the seat-bottom pad while a lower anchored end of the crotch belt remains coupled to the seat bottom of the juvenile seat. Each side belt is separated from the seat-back backrest by passing its backrest-anchor plate first in a forward direction through the belt-receiving aperture formed in the seat-back backrest and then in a forward direction through the belt-receiving aperture formed in the seat-pad backrest.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 11 is a perspective view of the mobile cart of FIG. 10 when the foldable frame is opened suggesting that the rolling-base stabilizer is mounted on the upper end of the rolling base for pivotable movement about a stabilizer-pivot axis from a folded-out position shown in FIG. 11 and associated with the expanded use mode of the stroller to a folded-in position shown in FIG. 13 and associated with a collapsed storage mode of the stroller and suggesting that the rolling-base pusher is also mounted on the upper end of the rolling base for pivotable movement about a separate pusher-pivot axis from a folded-out position shown in FIG. 11 and associated with the expanded use mode of the stroller to a folded-in position shown in FIG. 13 and associated with the collapsed storage mode of the stroller;

FIG. 12 is a view similar to FIG. 11 showing an early stage of a frame-closing sequence after a fold handle included in the lift-to-fold frame closer has been pulled upwardly by a caregiver to unlock a stabilizer-and-pusher pivot lock included in the frame-motion controller so that each of the rolling-base stabilizer and the rolling-base pusher is free to pivot relative to the upper end of the rolling base downwardly toward one another to allow a caregiver to move the foldable frame relative to the rolling base from the opened position (corresponding to the expanded use mode of the stroller) shown in FIG. 11 to the closed position (corresponding to the collapsed storage mode of the stroller) shown in FIG. 13;

FIG. 13 is a view similar to FIGS. 11 and 12 showing that the foldable frame has been moved to the closed position after a caregiver applied an upward lifting force to the fold handle included in the lift-to-fold frame closer as suggested in FIG. 12 to unlock the stabilizer-and-pusher pivot lock included in the lift-to-fold frame closer to free the rolling-base stabilizer and the rolling base pusher to pivot about separate pivot axes relative to the upper end of the rolling base toward one another;

DETAILED DESCRIPTION

Figure 1:
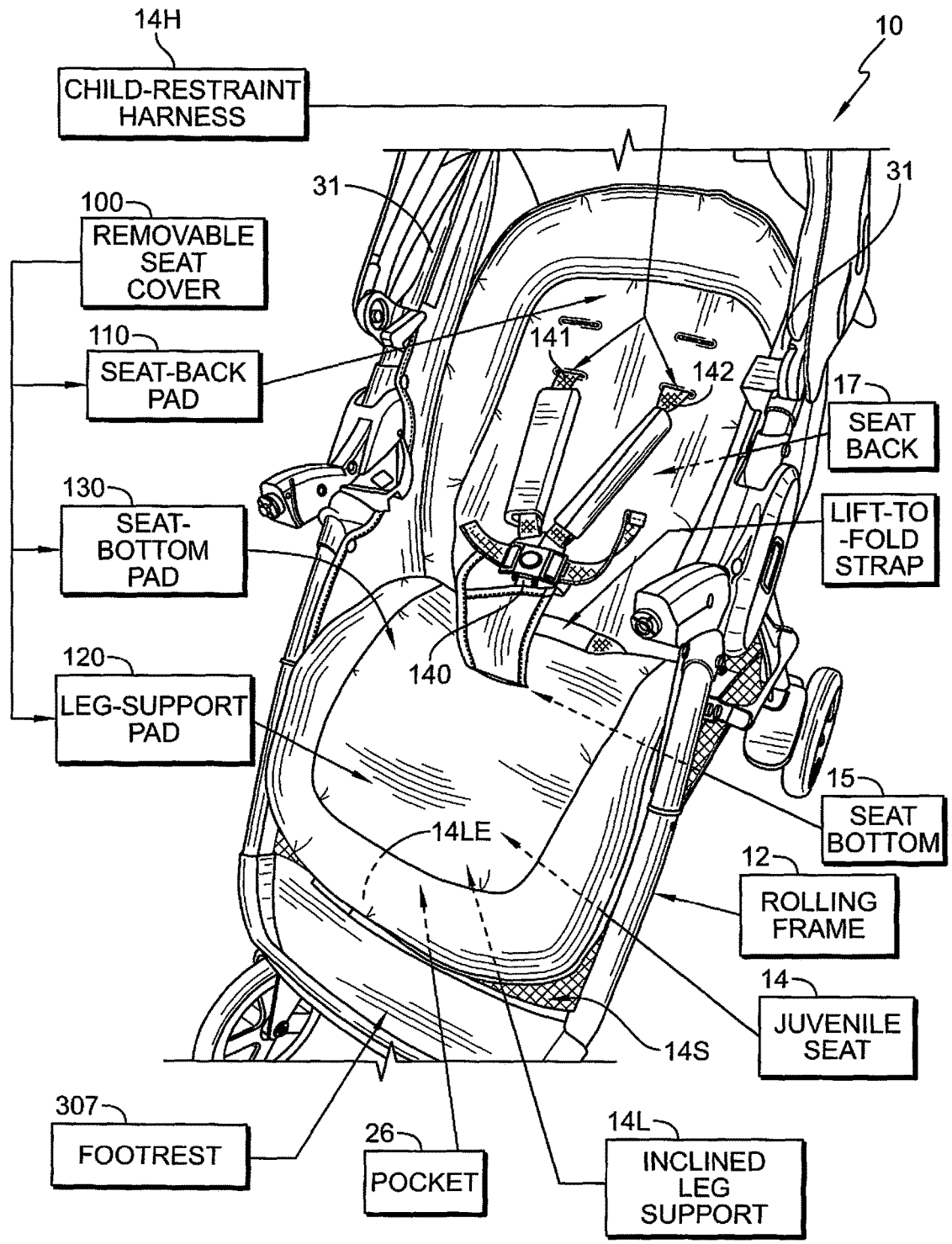
FIG. 1 is a perspective view of a juvenile stroller in accordance with the present disclosure showing a removable seat cover retained in place on an underlying juvenile seat comprising a seat bottom, an inclined seat back arranged to extend upwardly from a rear edge of the seat bottom, and an inclined leg support arranged to extend downwardly from a forward edge of the seat bottom and showing that the juvenile stroller also includes a mobile cart on which the juvenile seat is mounted; and a child-restraint harness comprising a crotch belt coupled to the seat bottom of the juvenile seat and arranged to extend through a companion belt-receiving aperture formed in the removable seat cover and first and second side belts coupled to the seat back and arranged to extend through companion belt-receiving apertures formed in the removable seat cover.
Figure 10:
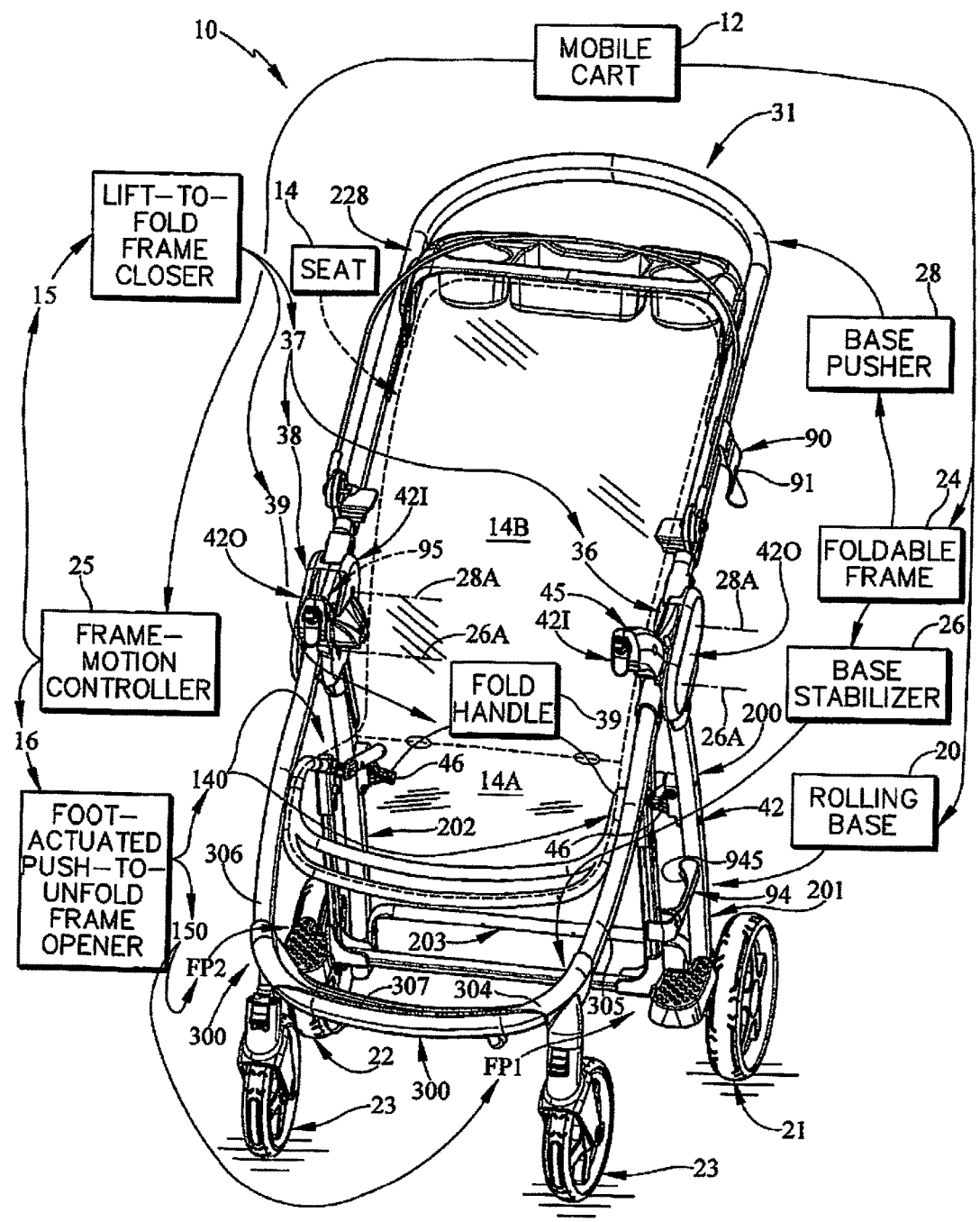
FIG. 10 is a perspective view of a collapsible stroller in accordance with the present disclosure shown in an illustrative expanded use mode and showing that the stroller includes a seat mounted on a mobile cart comprising a rolling base having rear wheels, a foldable frame, and a frame-motion controller, and suggesting that the foldable frame is configured to include a rolling-base stabilizer that has front wheels and extends forwardly and downwardly from an upper end of the rolling base and a rolling-base pusher that has a push handle and extends rearwardly and upwardly from the upper end of the rolling base when the foldable frame is opened as shown in FIG. 10, and that the frame-motion controller includes a lift-to-fold frame closer including a liftable fold handle and a foot-actuated push-to-fold frame opener including two foot pedals.

A juvenile stroller 10 in accordance with the present disclosure includes a juvenile seat 14 mounted on a rolling frame such as a mobile cart 12 having a push handle 31 as suggested in FIGS. 1 and 10. Juvenile seat 14 includes a seat bottom 15 and a seat back 17 extending upwardly from seat bottom 15.

Juvenile stroller 10 further includes a footrest 307 coupled to mobile cart 12 and arranged to lie below seat bottom 15 as suggested in FIGS. 1 and 10. Juvenile seat 14 also includes an inclined leg support 14L coupled to a forward edge of seat bottom 141 and arranged to extend downwardly toward footrest 307. Inclined leg support 14L has a downwardly extending free end 14LE that terminates at a laterally extending lower edge that is arranged to lie above and in spaced-apart relation to the footrest 307 that is mounted on mobile cart 12 to provide a space 14S therebetween.

Figure 2:
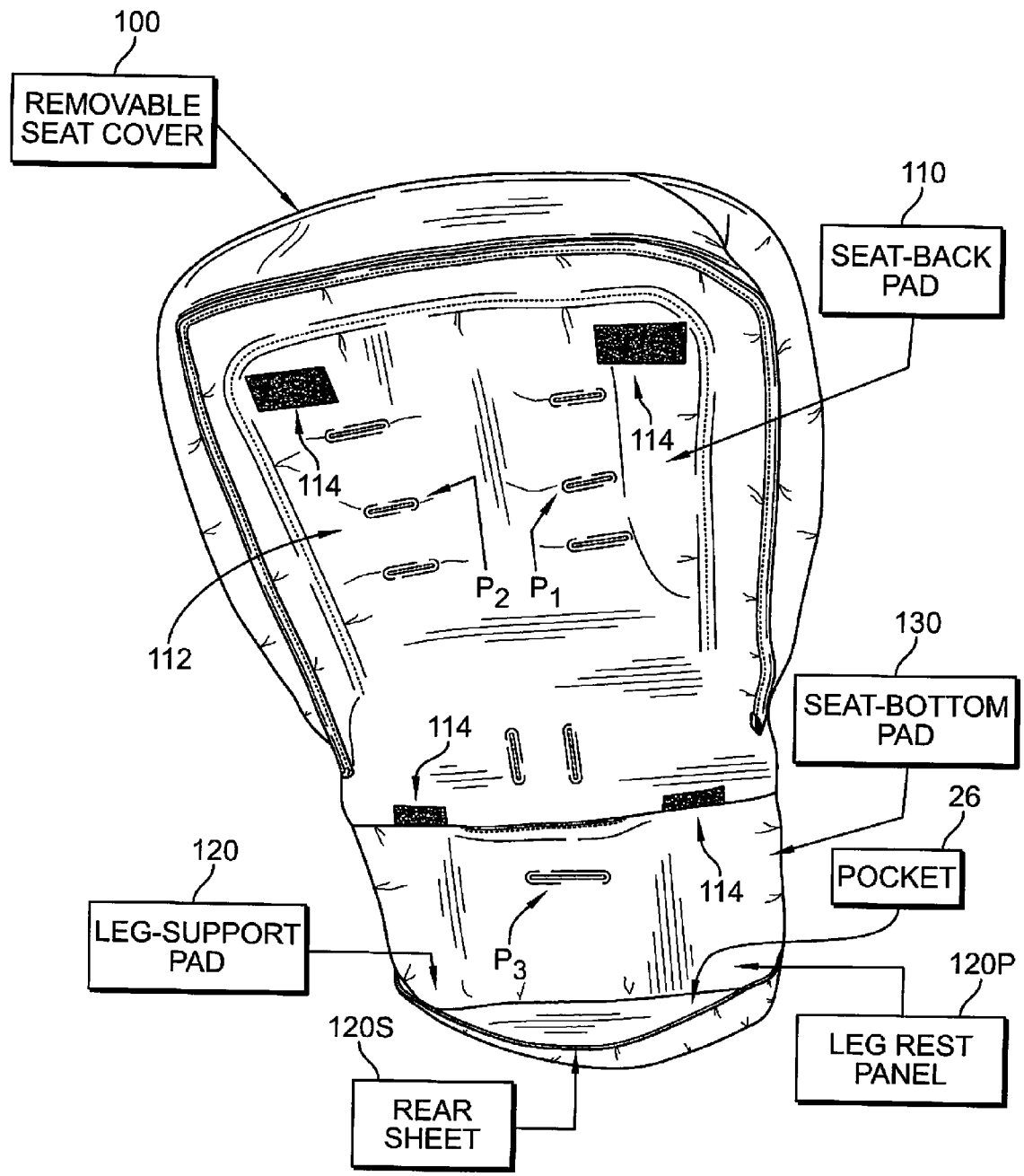
FIG. 2 is a perspective view of an underside of the removable seat cover after it has been removed from the juvenile seat by a caregiver in accordance with the present disclosure and showing that the removable seat cover includes (from top to bottom) a seat-back pad, four rearward-facing hook-and-loop fasteners coupled to the underside of the seat-back pad, a seat-bottom pad coupled to a lower edge of the seat-back pad along a central hinge line, and a leg-support pad comprising a leg-rest panel coupled to a lower edge of the seat-bottom pad and a rear sheet coupled to the leg-rest panel and arranged to cooperate with an underside of the leg-rest panel to form an upwardly opening pocket for receiving a free end of the inclined leg support included in the juvenile seat when the removable cover is mounted on the juvenile seat as suggested in FIG. 1.

Juvenile stroller 10 further includes a removable seat cover 100 comprising a seat-back pad 110, a leg-support pad 120, and a seat-bottom pad 130 arranged to interconnect seat-back 110 and leg-support pads 120 as suggested in FIGS. 1 and 2. Seat-back pad 110 includes a backrest 112 adapted to mate with a companion backrest 17B included in seat back 17 of juvenile seat 14 and several rearwardly facing hook-and-loop fasteners 114 configured to mate with companion forwardly facing hook-and-loop fasteners 114 coupled to backrest 17B of juvenile seat 14 to retain seat-back pad 110 on juvenile seat 14. Leg-support pad 120 includes a leg-rest panel 120P and a rear sheet 120S coupled to leg-rest panel 120P and arranged to cooperate with an underside of leg-rest panel 120P to form pocket means 26 for receiving free end 14LE of the inclined leg support 14L included in juvenile seat 14 therein to retain seat-bottom pad 130 on seat bottom 15 and leg-support pad 120 on leg support 14L as suggested in FIGS. 1 and 2.

Figure 5:
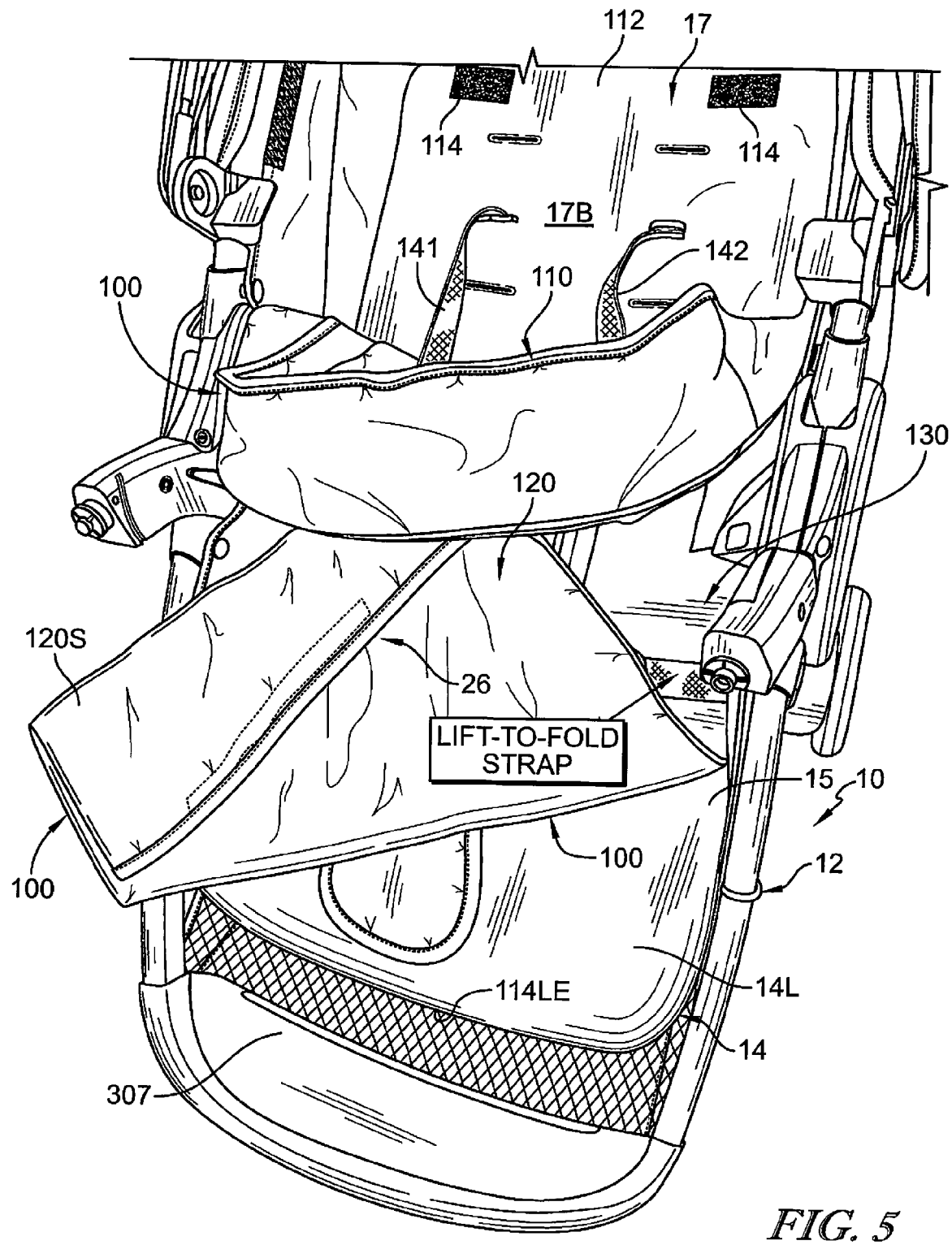
FIG. 5 is a front perspective view of the juvenile stroller of FIG. 1 showing forward movement of the seat-back pad of the removable seat cover away from the seat-pad backrest of the juvenile seat to unmate the hook-and-loop fasteners provided therebetween and showing upward movement of the leg-support pad of the removable seat cover relative to the inclined leg support of the juvenile seat after the inclined leg support of the juvenile seat is removed from the pocket formed in the leg-support pad.

Juvenile stroller 14 further includes a child-restraint harness 14H comprising a crotch belt 140 coupled to seat bottom 15 and first and second side belts 141, 142 coupled to backrest 17B of seat back 17 as suggested in FIGS. 1 and 5. The first and second side belts 141, 142 are configured to be passed through belt-receiving apertures $B_1$, $B_2$ formed in seat-back backrest 17B as suggested in FIG. 7 and belt-receiving apertures $P_1$, $P_2$ formed in seat-pad backrest 112 as suggested in FIG. 9 and then engaged to crotch belt 140 a suggested in FIG. 1 to restrain a child seated in juvenile seat 14.

A lower end of each of the first and second side belts 141, 142 is coupled directly to a forwardly facing surface of seat-back backrest 17B. An upper end of each of the first and second side belts 141, 142 is passed first through a companion belt-receiving aperture $P_1$ or $P_2$ formed in seat-pad backrest 112 and then through a companion belt-receiving aperture $B_1$ or $B_2$ formed in seat-back backrest 17B so that a backrest-anchor plate 141P or 142P included in a free end of each side belt 141, 142 engages a rearwardly facing surface of seat-back backrest 17B to anchor those free ends to seat back 17 of juvenile seat 14.

Removable seat cover 100 can be removed from juvenile seat 14 by a caregiver for cleaning after (1) disengagement of side belts 141, 142 from crotch belt 140, and (2) separation of crotch belt 140 from the seat-bottom pad 130 and separation of each side belt 141, 142 first from seat-back backrest 17B and then from seat-pad backrest 112, (3) forward movement of seat-pad backrest 112 away from seat-back backrest 17B to unmate the rearwardly facing hook-and-loop fasteners 114 on seat-pad backrest 112 from the forwardly facing hook-and-loop fasteners on seat-back backrest 17B, and (4) upward movement of leg-support pad 120 relative to inclined leg support 14L of juvenile seat 14 to remove inclined leg support 14L from the upwardly opening pocket means 26 formed in leg-support pad 120. Crotch belt 140 is separated from seat-bottom pad 130 by passing an upper free end of crotch belt 140 downwardly through a belt-receiving aperture P3 formed in seat-bottom pad 130 while a lower anchored end of crotch belt 140 remains coupled to seat bottom 15 of juvenile seat 15. Each side belt 141, 142 is separated from seat-back backrest 17B by passing its backrest-anchor plate 141P or 142P first in a forward direction through the belt-receiving aperture B1 or B2 formed in seat-back backrest 17B and then in a forward direction through the belt-receiving aperture P1 or P2 formed in seat-pad backrest 112.

A juvenile stroller 10 in accordance with the present disclosure includes a removable seat cover 100 retained in place on an underlying juvenile seat 14 comprising a seat bottom 15, an inclined seat back 17 arranged to extend upwardly from a rear edge of the seat bottom 15, and an inclined leg support 14L arranged to extend downwardly from a forward edge of seat bottom 15 as suggested in FIG. 1. Juvenile stroller 10 also includes a mobile cart 12 on which juvenile seat 14 is mounted and a child-restraint harness 14H. Child-restraint harness 14H includes a crotch belt 140 coupled to seat bottom 15 of juvenile seat 14 and arranged to extend through a companion belt-receiving aperture $P_3$ formed in the removable seat cover 100 and first and second side belts 141, 142 coupled to seat back 17 and arranged to extend through companion belt-receiving apertures $P_1$, $P_2$ formed in the removable seat cover 100.

An underside of the removable seat cover 100 after it has been removed from juvenile seat 14 by a caregiver in accordance with the present disclosure is shown in FIG. 2. Removable seat cover 100 includes (from top to bottom) a seat-back pad 110, four rearward-facing hook-and-loop fasteners 114 coupled to the underside of the seat-back pad 110, a seat-bottom pad 130 coupled to a lower edge of the seat-back pad 110 along a central hinge line, and a leg-support pad 120 comprising a leg-rest panel 120P coupled to a lower edge of seat-bottom pad 130 and a rear sheet 120S coupled to the leg-rest panel 120P and arranged to cooperate with an underside of the leg-rest panel 120P to form an upwardly opening pocket 26 for receiving a free end 114LE of inclined leg support 14L included in juvenile seat 14 when removable cover 100 is mounted on juvenile seat 14 as suggested in FIG. 1.

Figure 3:
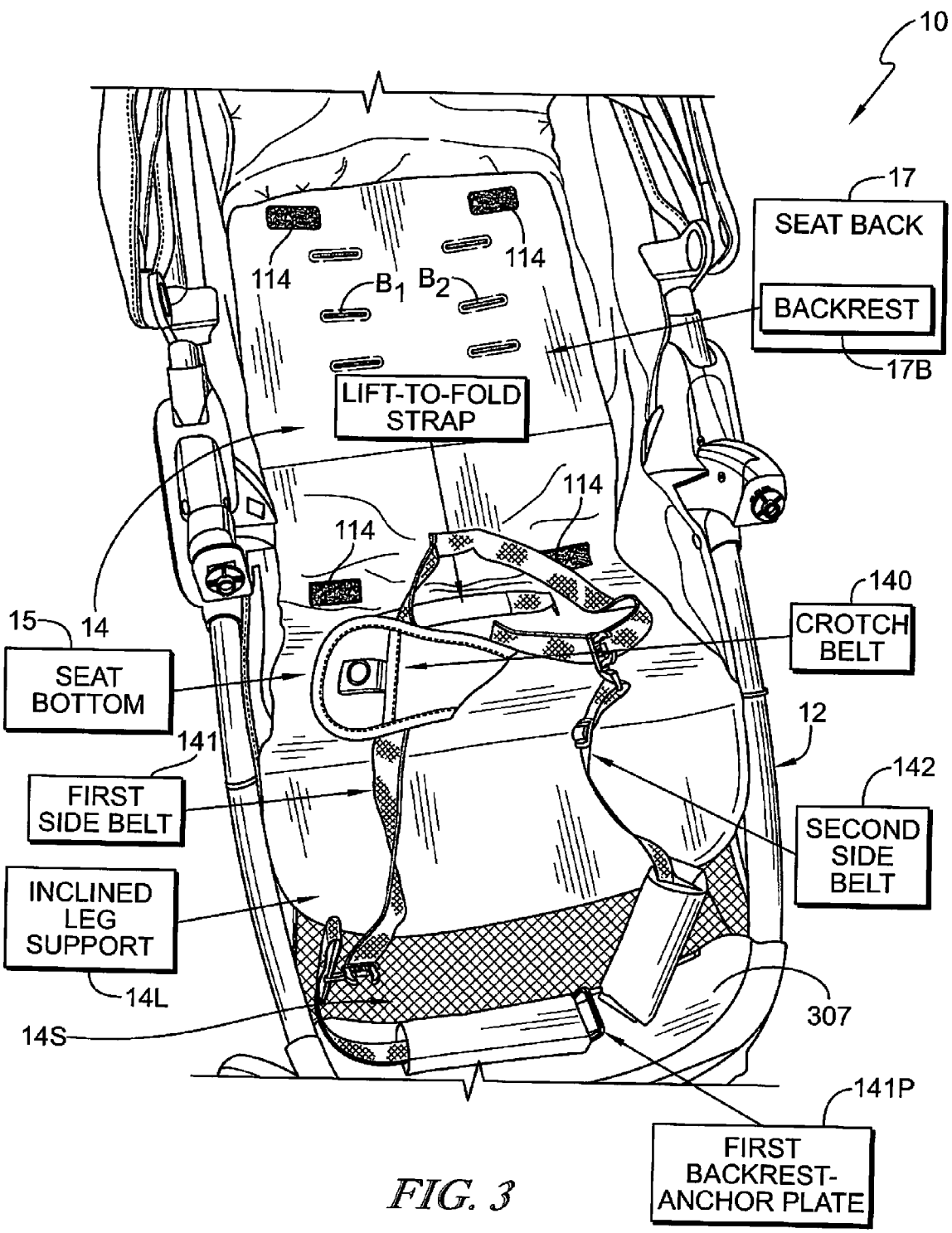
FIG. 3 is a perspective view showing the juvenile seat and the child-restraint harness in the stroller of FIG. 1 after removal of the removable seat cover and showing that the juvenile seat includes (in series) an upwardly extending inclined seat back having a backrest, a seat bottom, and a downwardly extending inclined leg support and showing that the rolling frame includes a laterally extending footrest that is located below and in spaced-apart relation to a lower edge of the inclined leg support of the juvenile seat.

Juvenile seat 14 and child-restraint harness 14H in stroller 10 are shown in FIG. 3 after removal of the removable seat cover 100. Juvenile seat 14 includes (in series) an upwardly extending inclined seat back 17 having a backrest 17B, a seat bottom 15, and a downwardly extending inclined leg support 14L. Mobile cart 12 includes a laterally extending footrest 307 that is located below and in spaced-apart relation to a lower edge of inclined leg support 14L of juvenile seat 14 to provide a space 14S therebetween.

Figure 4:
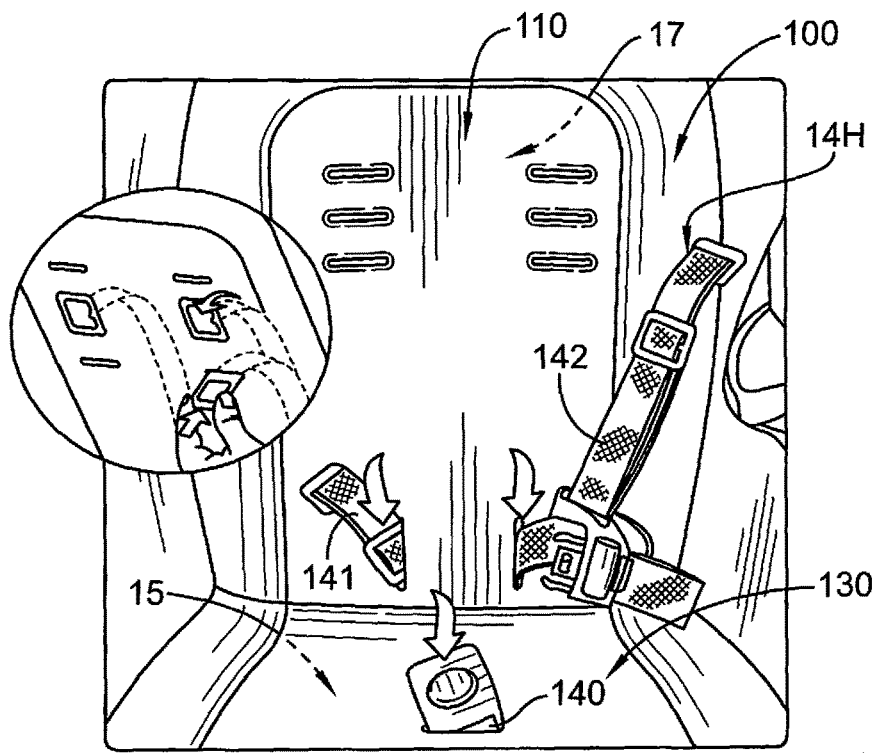
FIGS. 4, 4a, and 4b illustrate a process in accordance with the present disclosure for removing the seat cover from the juvenile seat.
Figure 4A:
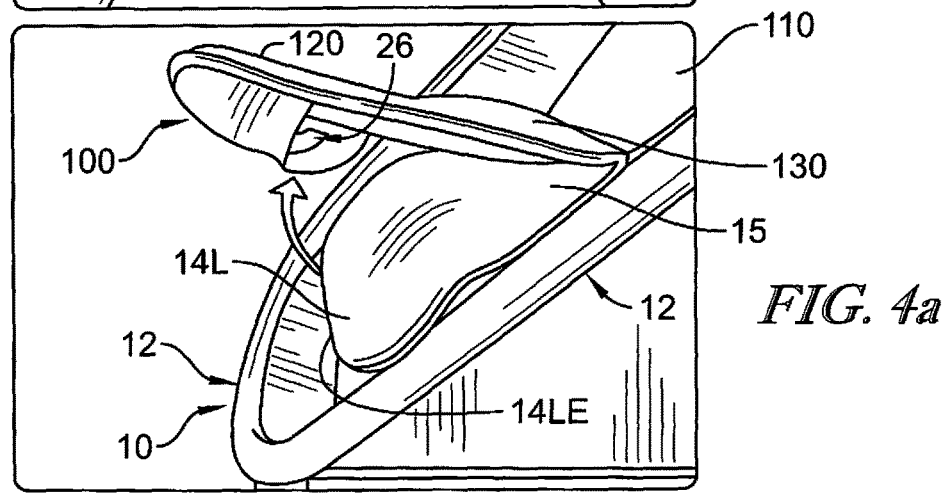
Figure 4B:
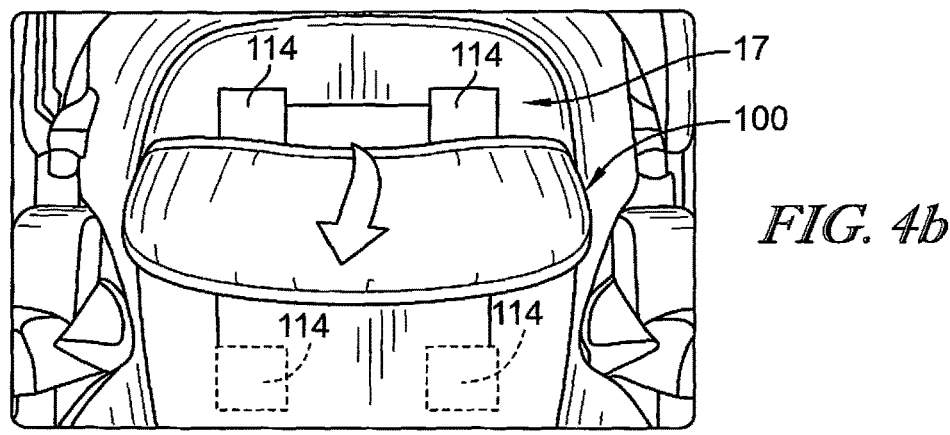

A process in accordance with the present disclosure for removing the seat cover 100 from juvenile seat 14 is illustrated in FIGS. 4, 4a, and 4b. Forward movement of seat-back pad 110 of the removable seat cover 100 away from seat-pad backrest 112 of the juvenile seat 14 to unmate the hook-and-loop fasteners provided therebetween is shown in FIG. 5. Upward movement of leg-support pad 120 of removable seat cover 100 relative to inclined leg support 14L of juvenile seat 14 after inclined leg support 14L of juvenile seat 14 is removed from the pocket 26 formed in leg-support pad 120 is also shown in FIG. 5.

Figure 6:
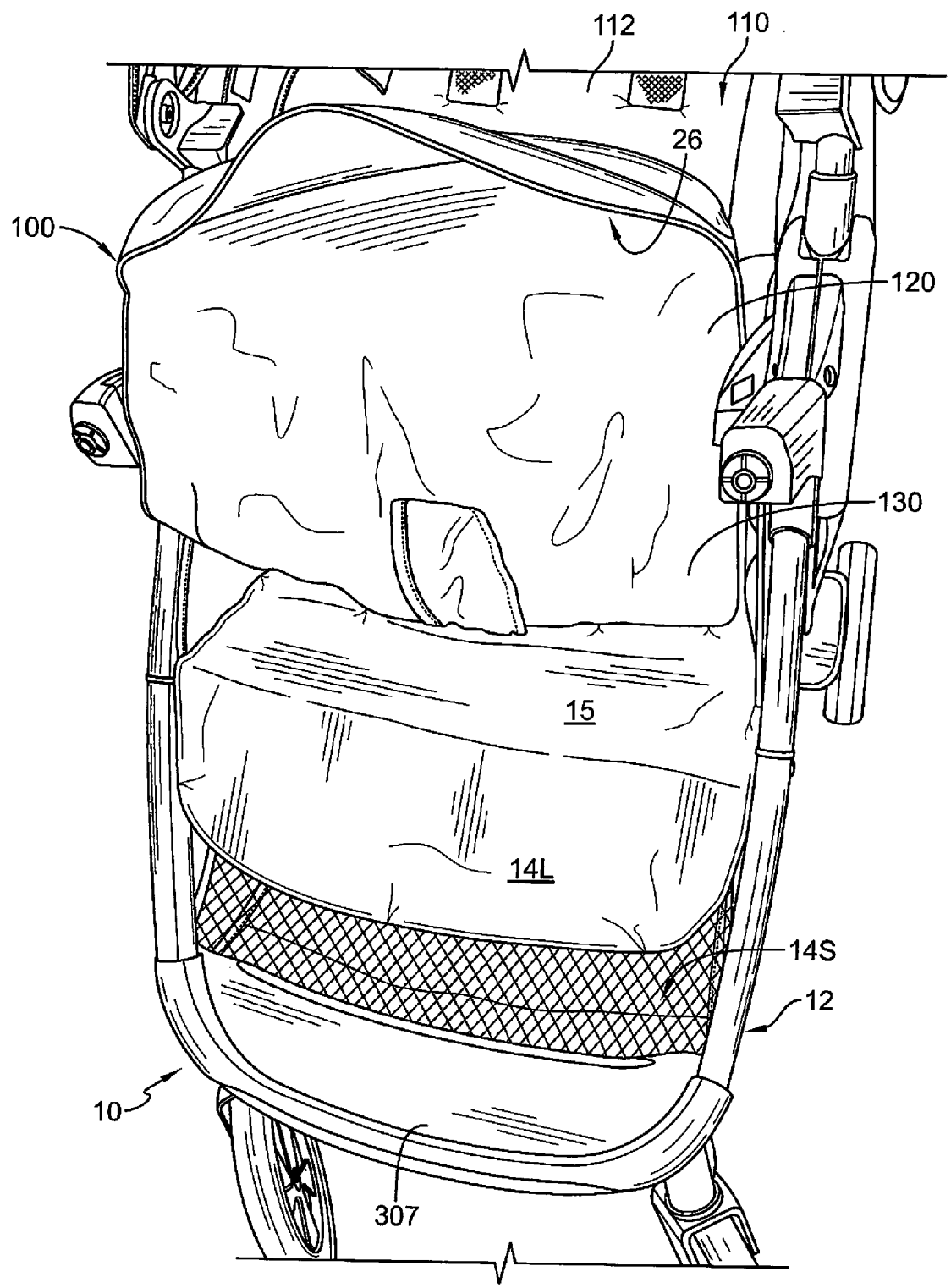
FIG. 6 is a view similar to FIG. 5 showing upward movement of the rear sheet away from the underlying leg-rest panel to show an opened pocket formed in the leg-support pad of the removable seat cover and showing the inclined leg-support of the juvenile seat after it has been uncovered following separation from the leg-support pad.

Upward movement of the rear sheet away from the underlying leg-rest panel to show an opened pocket 26 formed in the leg-support pad 120 of the removable seat cover 100 is shown in FIG. 6. Inclined leg-support 14L of juvenile seat 14 after it has been uncovered following separation from leg-support pad 120 is also shown in FIG. 6.

Figure 7:
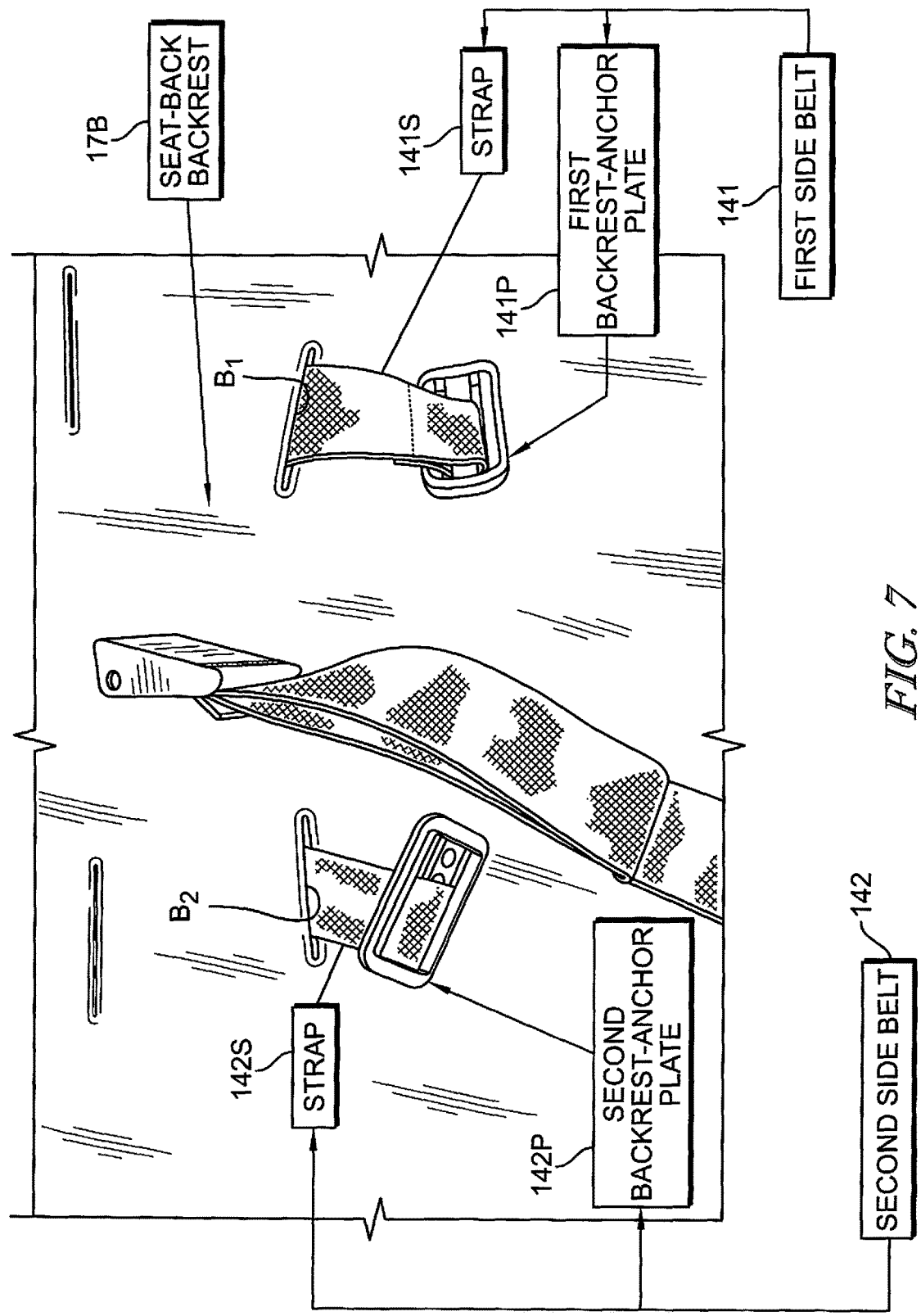
FIG. 7 is an enlarged view of a portion of the backrest of the seat back of the juvenile seat showing that the first side belt includes a first backrest-anchor plate coupled to a first shoulder strap and suggesting that the first backrest-anchor plate normally will engage a rearwardly facing surface of the seat-back backrest to block separation of the first side belt from the seat-back backrest and also showing that the second side belt includes a second backrest-anchor plate coupled to a second shoulder strap and suggesting that the second backrest-anchor plate normally will engage the rearwardly facing surface of the seat-back backrest to block separation of the second side belt from the seat-back backrest.

First side belt 141 includes a first backrest-anchor plate 141P coupled to a first shoulder strap 141S as shown in FIG. 7. First backrest-anchor plate 141P normally will engage a rearwardly facing surface of the seat-back backrest 17B to block separation of the first side belt 144 from the seat-back backrest 17B. Second side belt 142 includes a second backrest-anchor plate 142P coupled to a second shoulder strap 142S as shown in FIG. 7. Second backrest-anchor plate 142P normally will engage the rearwardly facing surface of the seat-back backrest 17B to block separation of the second side belt 142 from seat-back backrest 17B.

Figure 8:
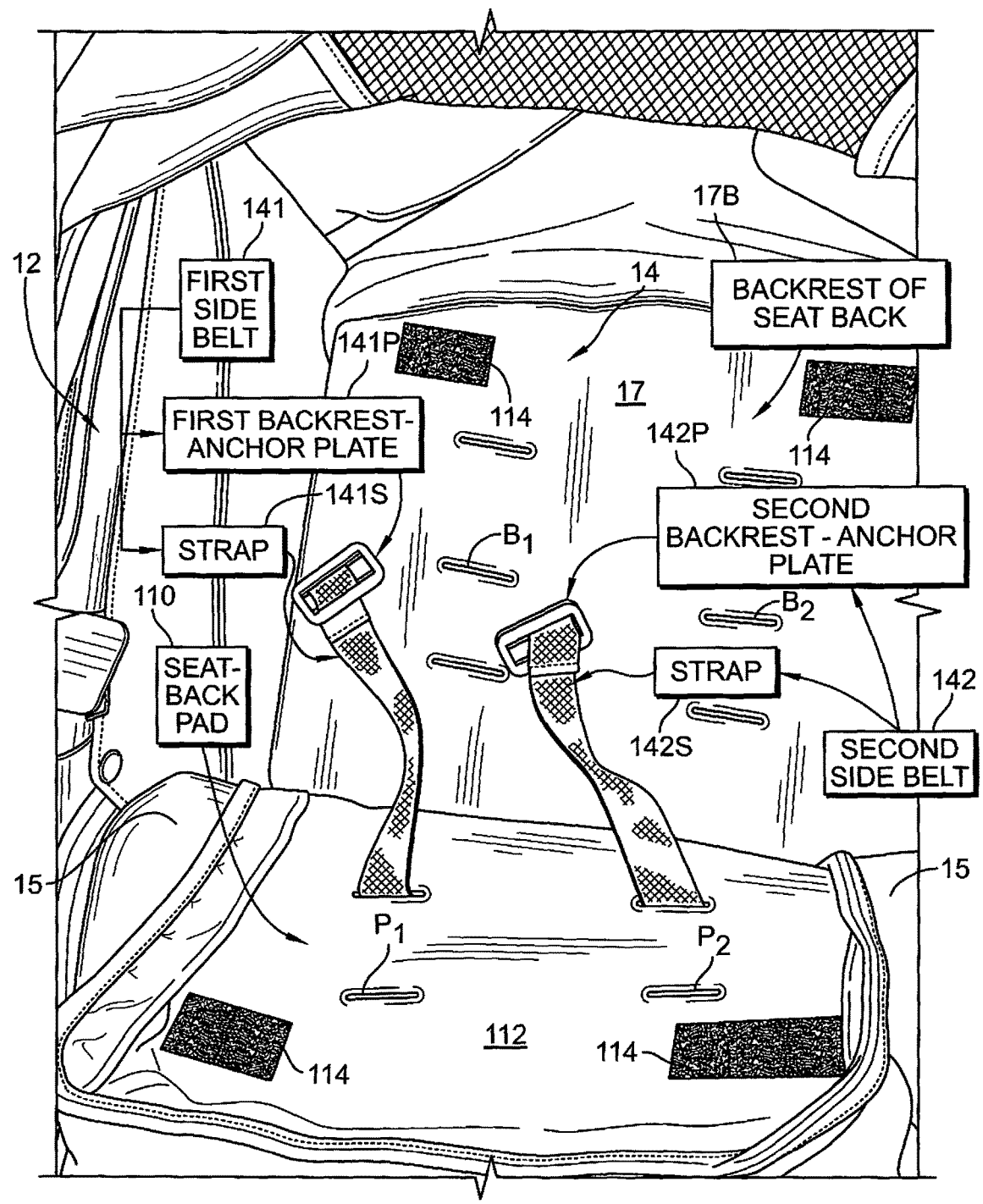
FIG. 8 shows that each side belt can be separated from the seat-back backrest after each backrest-anchor plate has been turned sideways and then pushed through the companion belt-receiving aperture formed in the seat-back backrest and shows that each of the side belts still extends through a companion belt-receiving aperture formed in the seat-back pad of the removable seat cover.

Each side belt 141, 142 can be separated from seat-back backrest 17B after each backrest-anchor plate 141P, 142P has been turned sideways and then pushed through the companion belt-receiving aperture formed in seat-back backrest 17B as suggested in FIG. 8. Each of the side belts 141, 142 still extends through a companion belt-receiving aperture formed in the seat-back pad 110 of the removable seat cover 100.

Figure 9:
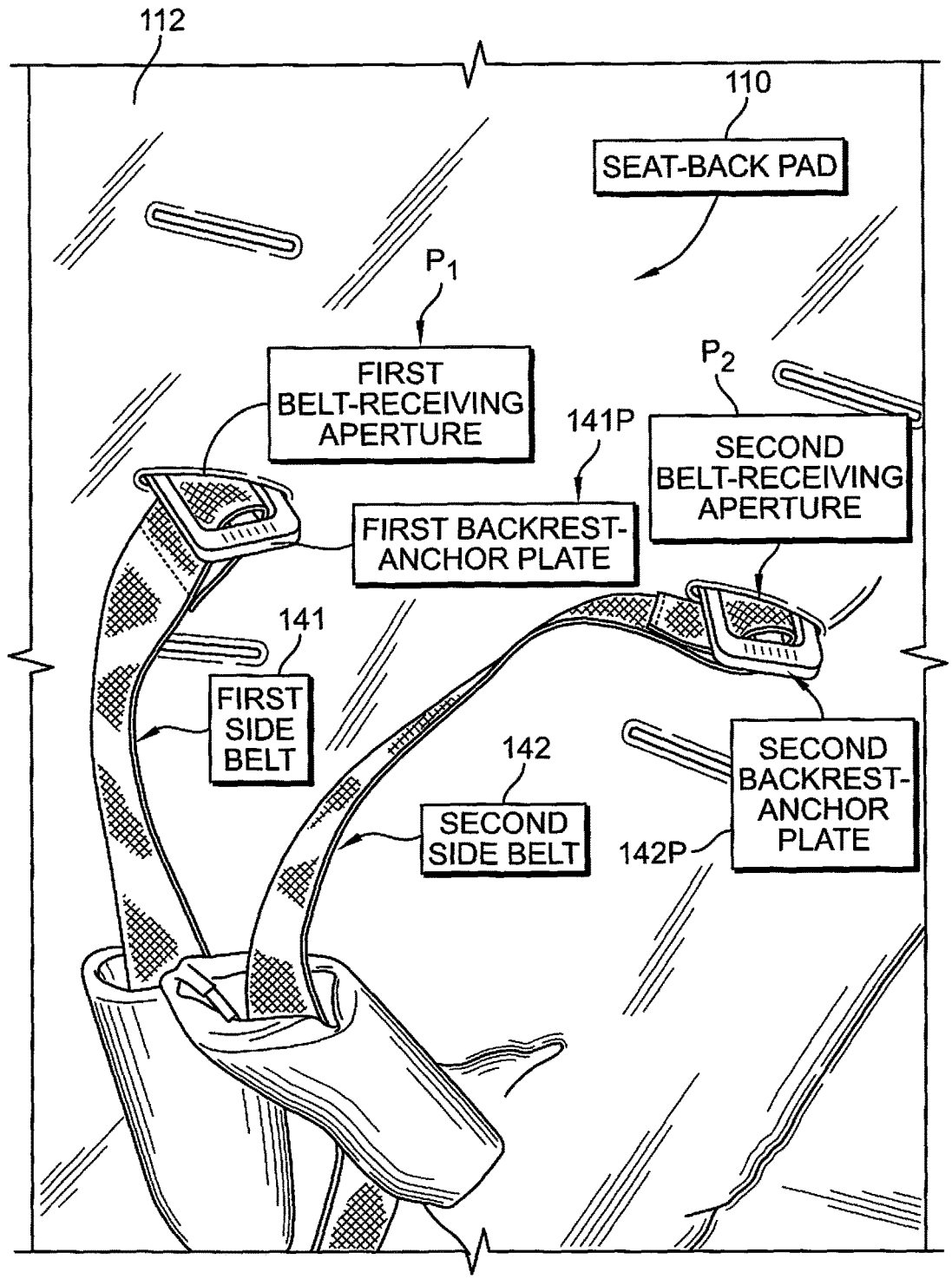
FIG. 9 shows sideways movement of the first backrest-anchor plate of the first side belt to separate the first side belt from the seat-pad backrest of the removable seat cover and sideways movement of the second backrest anchor plate of the second side belt to separate the second side belt from the seat-pad backrest of the removable seat cover.

Sideways movement of the first backrest-anchor plate 141P of first side belt 141 to separate first side belt 141 from the seat-pad backrest 112 of the removable seat cover 100 is suggested in FIG. 9. Sideways movement of second backrest anchor plate 142P of the second side belt 142 to separate second side belt 142 from the seat-pad backrest 112 of the removable seat cover 100 is also suggested in FIG. 9.

Figure 15:
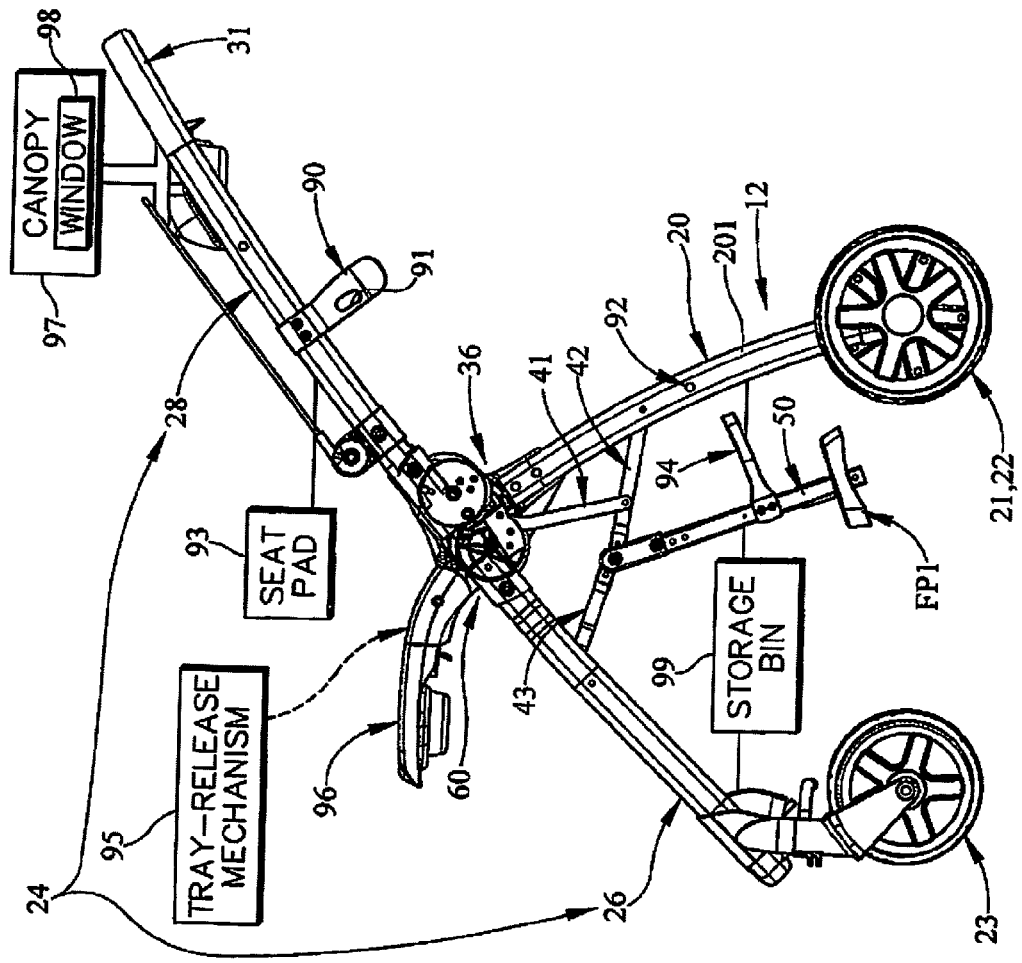
FIG. 15 is a side elevation view of the mobile cart showing the foldable frame of the mobile cart in the opened position after a user stepped down on a foot pedal included in the foot-actuated push-to-unfold frame opener causing the rolling-base stabilizer and the rolling-base pusher to move relative to the upper end of the rolling base to their folded-out positions.
Figure 14:
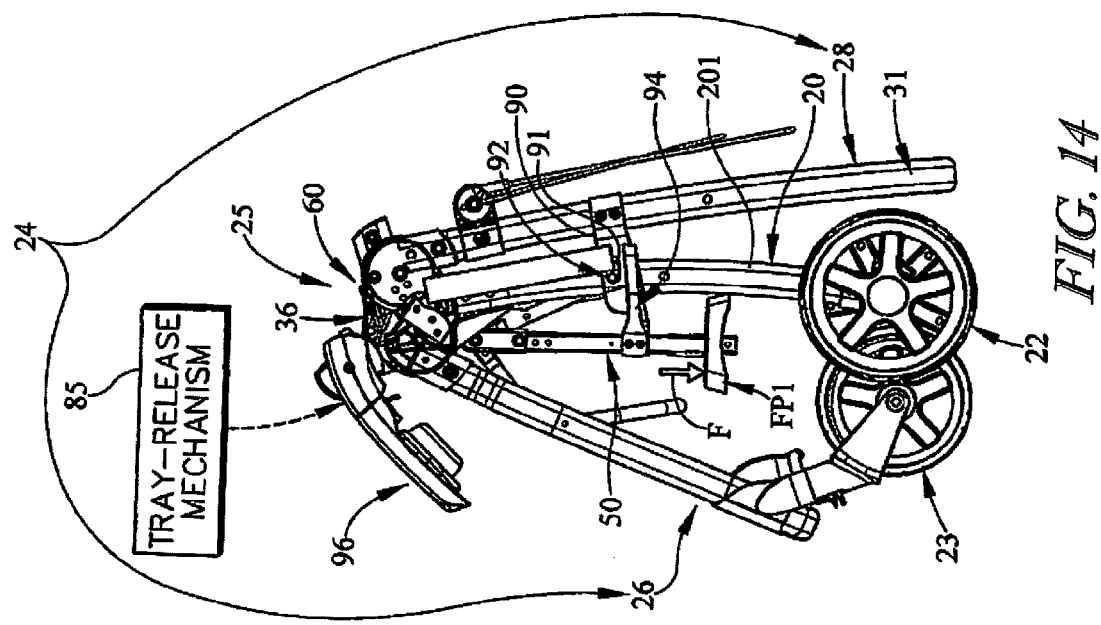
FIG. 14 is a side elevation view of the mobile cart showing the foldable frame of the mobile cart in the closed position before a user steps down on a foot pedal included in the foot-actuated push-to-unfold frame opener to pivot the rolling-base stabilizer and the rolling-base pusher of the foldable frame about their respective pivot axes to the folded-out positions and unfold the foldable frame to the opened position.

A collapsible stroller 10 in accordance with the present disclosure is shown in FIG. 10 and is configured to move as suggested in FIGS. 11-13 from an expanded use mode shown in FIGS. 10, 11, and 15 to a collapsed storage mode shown in FIGS. 13 and 14. Stroller 10 includes a mobile cart 12 and a seat 14 coupled to mobile cart 12 as shown in FIG. 10. Mobile cart 12 includes a rolling base 20 including rear wheels 21, 22, a foldable frame 24 including front wheels 23, 23 and being mounted for movement on the rolling base 20 between an opened position shown in FIGS. 10 and 11 and a closed position shown in FIG. 13, and a frame-motion controller 25 as shown, for example, in FIG. 10. Frame-motion controller 25 is coupled to rolling base 20 and to foldable frame 24 and operated by a caregiver as described and illustrated herein to fold and unfold the foldable frame 24 and thereby change the mode of stroller 10 between the expanded use mode and the collapsed storage mode.

Frame-motion controller 25 includes a lift-to-fold frame closer 15 and a foot-actuated push-to-unfold frame opener 16 as suggested in FIG. 10. Lift-to-fold frame closer 15 is configured to allow a user to collapse stroller 10 for storage using only one hand. This collapse is accomplished by lifting upwardly on a fold handle 39 coupled to foldable frame 24 to cause foldable frame 24 to fold in toward rolling base 20 so as to move from an opened position shown in FIG. 11 to closed position shown in FIG. 13. The foot-actuated push-to-unfold frame opener 16 is configured to allow a user to expand stroller 10 using only one foot. This expansion is accomplished by stepping downwardly on a foot pedal FP1 to cause foldable frame 24 to unfold relative to rolling base 20 as suggested in FIGS. 14 and 15 and move from the closed position to the opened position.

Rolling base 20 of mobile cart 12 illustratively includes first leg 201, a second leg 202, and a cross bar 203 arranged to interconnect legs 201, 202 as shown in FIG. 10. A first rear wheel 21 is coupled to a lower end of first leg 201. A second rear wheel 22 is coupled to a lower end of second leg 202.

Foldable frame 24 includes a pivotable rolling-base stabilizer 26 having front wheels 23 and a pivotable rolling-base pusher 28 having a push handle 31 as shown in FIG. 10. Rolling-rolling-base stabilizer 26 is coupled to an upper end of rolling base 20 for pivotable movement about a stabilizer-pivot axis 26A. Rolling-base pusher 28 is coupled to the upper end of rolling base 20 for pivotable movement about a pusher-pivot axis 28A that is arranged, in illustrative embodiments, to lie in spaced-apart relation to stabilizer-pivot axis 26A. Each of rolling-base stabilizer 26 and rolling-base pusher 28 of the foldable frame 24 are arranged to pivot relative to rolling base 20 (as suggested by arrows 26P, 28P) from a folded-out position (corresponding to the expanded use mode of stroller 10) shown in FIGS. 10, 11, and 15 to a folded-in position (corresponding to the collapsed storage mode of stroller 10) shown in FIGS. 13 and 14.

In the opened position of foldable frame 24, rolling-base stabilizer 26 and rolling-base pusher 28 are unfolded to extend away from one another and from the upper end of the rolling base 20 to deploy a foldable seat 14 mounted to mobile cart 12 when stroller 10 is in the expanded use mode as shown, for example, in FIGS. 10-12 and 14. In the closed position of foldable frame 24, rolling-base stabilizer 26 and rolling-base pusher 28 are folded toward one another to extend along the length of rolling base 20 to stow foldable seat 14 and reduce the footprint of mobile cart 12 (i.e. make it more compact) to allow easy storage of stroller 10 when stroller 10 is in the collapsed storage mode as shown, for example, in FIGS. 13 and 15.

Frame-motion controller 25 illustratively includes a lift-to-fold frame closer 15 and a foot-actuated push-to-unfold frame opener 16 as shown in FIG. 10. Lift-to-fold frame closer 15 is configured to provide frame-closer means for selectively freeing foldable frame 24 to move to the closed position in response to a user lifting upwardly in direction 39U on fold handle 39 with one hand as suggested in FIGS. 11-13. Foot-actuated push-to-unfold frame opener 16 is configured to provide frame-opener means for pushing foldable frame 24 to the opened position in response to a user stepping down on foot pedal FP1 with one foot. Thus, using frame-motion controller 25, a caregiver can both collapse and expand stroller 10 using only one appendage (e.g. arm or leg) while allowing the other appendages of that caregiver to be free for holding a child or for some other purpose.

Lift-to-fold frame closer 15 is configured to provide fold means for releasing foldable frame 24 to move from (1) an opened position in which rolling-base stabilizer 26 and rolling-base pusher 28 are unfolded to extend away from rolling base 20 and from one another to open the foldable seat 14 that is coupled to the foldable frame 24 to support a child sitting on a seat 14 mounted to mobile cart 12 when mobile cart 12 is in use to (2) a closed position in which rolling-base stabilizer 26 and rolling-base pusher 28 are folded to move toward one another and toward rolling base 20 and extend along rolling base 20 to reduce the footprint of mobile cart 12 and to allow storage of stroller 10 in response to a user lifting upwardly with one hand on a fold handle 39 included in frame-motion controller 25. In the illustrated embodiment, lift-to-fold frame closer 15 includes a stabilizer-and-pusher pivot lock 37 and a fold handle 39 as suggested in FIG. 10. Stabilizer-and-pusher pivot lock 37 is configured to block or allow movement of foldable frame 24 from the opened position to the closed position. Fold handle 39 selectively releases stabilizer-and-pusher pivot lock 37 when a user lifts upwardly on fold handle 39 to allow movement of foldable frame 24 from the opened position to the closed position.

Stabilizer-and-pusher pivot lock 37 of the lift-to-fold frame closer 15 illustratively includes a first locking unit 36 and a second locking unit 38 as shown in FIG. 10. First locking unit 36 is coupled to first leg 201 of rolling base 20 and is arranged to lie along a first side of mobile cart 12. Second locking unit 38 is coupled second leg 202 of rolling base 20 and is arranged along and opposite second side of mobile cart 12.

Fold handle 39 is illustratively a flexible band or strip of material that extends through a slot or channel formed in seat 14 and interconnects first and second locking units 36, 38 as shown in FIG. 10. Fold handle 39 is accessible to a caregiver when a child is not supported in seat 14. When a caregiver pulls fold handle 39 upwardly as suggested by arrow 39U, stabilizer-and-pusher pivot lock 37 changes from a locked mode to an unlocked mode to allow movement of the foldable frame 24 from the opened position to the closed position.

Seat 14 is illustratively made from fabric stretched across a frame as suggested in FIG. 10. Seat 14 includes a seat bottom 14A and a seat back 14B as suggested in FIG. 10. Fold handle 39 extends through a slot or opening formed in the seat 14 at a junction between seat bottom 14A and seat back 14B so that fold handle 39 extends upwardly above seat 14 and is available to be gripped by a caregiver when a child is not supported on seat 14 of stroller 10.

Stroller 10 also includes a foot-actuated push-to-unfold base opener 16 for use by a caregiver to unfold foldable frame 24 suggested in FIGS. 14 and 15 to change stroller 10 from a collapsed storage mode shown in FIGS. 13 and 14 to an expanded use mode shown in FIGS. 10, 11, and 15. Foot-actuated frame opener 16 includes two foot pedals FP1 and FP 2 in the illustrated embodiment.

Rolling base 20 provides a rolling rear-leg unit as suggested in FIG. 10. Rolling-base stabilizer 26 provides a rolling front-leg unit that is coupled to an upper end of rolling base 20 for pivotable movement about a horizontal leg stabilizer-pivot axis 26A between a folded position associated with a collapsed storage mode of stroller 10 and shown in FIGS. 13 and 15 and an unfolded position associated with an expanded use mode of stroller 10 and shown in FIGS. 10, 11, and 15. A foot-actuated frame opener 16 is included in stroller 10 as suggested in FIG. 10 and configured to include a first foot pedal FP1 along a near side of mobile base 12 and to provide means for unfolding foldable frame 24 to change foldable frame 24 from the folded closed position shown in FIGS. 13 and 14 to the unfolded opened position shown in FIGS. 10, 11, and 15 in response to application by a caregiver of a downward force F to first foot pedal FP1. A similar second foot pedal FP2 is provided on an opposite far side of mobile base 12 as suggested in FIG. 10.

Foldable frame 24 is configured to fold when not in use to assume a folded closed position as suggested in FIGS. 13 and 14. A caregiver can fold foldable frame 24 by lifting upwardly on lift handle 39 to unlock stabilizer-and-pusher pivot lock 37 (e.g. each of first and second locking units 37, 38) to cause rolling-base stabilizer 26 to pivot about stabilizer-pivot axis 26A in a rearward (i.e. counterclockwise) direction 26P toward rolling base 20 and simultaneously to cause rolling-base pusher 28 to pivot about pusher-pivot axis 28A in a downward (i.e. clockwise) direction 28P toward rolling base 20 as suggested in FIGS. 11-13.

A caregiver can unfold foldable frame 24 by pushing downwardly on one of the footpedals FP1 or FP2 to cause rolling-base stabilizer 26 to pivot about stabilizer-pivot axis 26A in a forward (i.e. clockwise) direction way from rolling base 20 and simultaneously to cause rolling-base pusher 28 to pivot about pusher-pivot axis 28A in an upward (i.e. counterclockwise) direction away from rolling base 20 as suggested in FIG. 15. Unfolding of foldable frame 24 of stroller 10 is accomplished easily, for example, by applying a downward pedal-actuation force F to first foot pedal FP1 of foot-actuated base opener 16 as suggested in FIG. 14 until rolling-base stabilizer 26 is pivoted about stabilizer-pivot axis 28A in a clockwise direction away from rolling base 20. In illustrative embodiments, this unfolding of foldable frame 24 also causes rolling-base pusher 28 to pivot about a pusher-pivot axis 28A in a counterclockwise direction from a stowed position shown in FIGS. 4 and 12 toward a deployed position shown in FIGS. 10, 11, and 15 owing to provision of a handle-mover linkage 41 that is coupled to push handle 15 and mobile base 12 as suggested in FIG. 15.

Rolling base 20 includes a rear frame 200 arranged to intersect stabilizer-pivot axis 26A and rear wheels 21, 22 mounted on rear frame 200 for rotation about an axis of rotation as suggested in FIG. 10. Rear frame 200 includes a horizontally extending rear strut 203 lying between rear wheels 21, 22 and extending is spaced-apart parallel relation to axis of rotation of rear wheels 21, 22. Rear frame 200 also includes first and second rear legs 201, 202. First rear leg 201 is coupled to rear strut 203 to lie near first rear wheel 21 and second rear leg 202 is coupled to rear strut 203 to lie near second rear wheel 22. A brake system may be integrated into each rear wheel 21, 22 or more generally into rolling base 20.

Rolling-base stabilizer 26 of mobile base 12 includes a front frame 300 arranged to intersect stabilizer-pivot axis 26A and front wheels 23 mounted on front frame 300 using a swivel mount in an illustrative embodiment. Front frame 300 includes a horizontally extending front strut 304 lying between front wheels 23 and in generally parallel relation to rear strut 203. Front frame 300 also includes first and second front legs 305, 306. First front leg 305 is coupled to front strut 304 near first front wheel 23 and second front leg 306 is coupled to front strut 304 near second front wheel 301. A foot-rest panel 307 is coupled to front frame 300 in an illustrative embodiment as suggested in FIG. 10.

In illustrative embodiments, mobile base 12 also includes a storage lock tab 90 as shown in FIGS. 10, 14, and 15. Storage lock tab 90 is coupled to rolling-base pusher 28 and is formed to include a hole 91 that receives a lock pin 92 attached to rolling base 20 when foldable frame 24 is in the closed position as shown in FIG. 14. Storage lock tab 90 is flexible to be lifted out of engagement with lock pin 92 to allow movement of foldable frame 24 to the opened position.

In illustrative embodiments, frame-motion controller 25 also includes a tray-release mechanism 95 as shown diagrammatically in FIG. 14. Tray-release mechanism 95 is configured to release a removable tray 96 included in mobile cart 12 to pivot under gravitational forces relative to the rest of mobile cart 12 from an extended-use position to a folded-stowed position when a user lifts upwardly on fold handle 39 in direction 39U as suggested in FIG. 14. Accordingly, tray 96 is moved automatically to the folded-stowed when stroller 10 is moved to the collapsed-storage position.

In illustrative embodiments, stroller 10 includes a fold-away canopy 97 as shown diagrammatically in FIG. 15. Fold-away canopy 97 includes a closable peek-a-boo window 98 for checking on a child seated in stroller 10.

In illustrative embodiments, stroller 10 includes a storage bin 99 arranged under seat 14 as shown diagrammatically in FIG. 15. Storage bin 99 is accessible to a user pushing rolling-base pusher 28.

The invention claimed is:

1. A juvenile stroller comprising
a mobile cart having a push handle, a juvenile seat mounted on the mobile cart, the juvenile seat including a seat bottom, a seat back arranged to extend upwardly from the seat bottom, an inclined leg support associated with a forward edge of the seat bottom and arranged to extend downwardly toward ground underlying the mobile cart, and a child-restraint harness comprising a crotch belt coupled to the seat bottom and first and second side belts coupled to a backrest of the seat back, and a removable seat cover comprising a seat-back pad, a leg-support pad, and a seat-bottom pad arranged to interconnect the seat-back and leg-support pads, the seat-back pad includes a backrest adapted to mate with the backrest included in the seat back and several rearwardly facing fasteners configured to mate with companion forwardly facing fasteners coupled to the backrest of the seat back to retain the seat-back pad in a fixed position on the seat back, the leg-support pad includes a leg-rest panel and a rear sheet coupled to the leg-rest panel and arranged to cooperate with an underside of the leg-rest panel to form a pocket for receiving a free end of the inclined leg support to retain the seat-bottom pad on the seat bottom and the leg-support pad on the inclined leg support, wherein the first and second side belts pass through belt-receiving apertures formed in the backrest of the seat back and the backrest of the seat pad and engage the crotch belt to restrain a child seat in the juvenile seat, a lower end of each of the first and second side belts is coupled directly to a forwardly facing surface of the backrest of the seat back, in an anchored position, only an upper end of each of the first and second side belts extends within a companion belt-receiving aperture formed in the backrest of the seat pad and the backrest of the seat back so that a backrest-anchor plate included in a free end of each of the first and second side belts engages a rearwardly facing surface of the backrest of the seat back to anchor those free ends to the seat back.

2. The juvenile stroller of claim 1, wherein a process for removing the removable seat cover from the juvenile seat so that the removable seat cover can be separated from the juvenile seat by a caregiver for cleaning comprises of steps of disengaging the first and second side belts from the crotch belt, separating the crotch belt from the seat-bottom pad, separating each of the first and second side belts first from the backrest of the seat back and then from the backrest of the seat pad, forwardly moving the backrest of the seat pad away from the backrest of the seat back to unmate the rearwardly facing fasteners on the backrest of the seat pad from the forwardly facing fasteners on the backrest of the seat back, and upwardly moving the leg-support pad relative to the inclined leg support to remove the inclined leg support from the upwardly opening pocket formed in the leg-support pad.

3. The juvenile stroller of claim 2, wherein the crotch belt is separated from the seat-bottom pad by passing an upper free end of the crotch belt downwardly through a belt-receiving aperture formed in the seat-bottom pad while a lower end of the crotch belt remains coupled to the seat bottom.

4. The juvenile stroller of claim 3, wherein each of the first and second side belts is separated from the backrest of the seat back by passing a companion backrest-anchor plate first in a forward direction through a companion belt-receiving aperture formed in the backrest of the seat back and then in a forward direction through a companion belt-receiving aperture formed in the backrest of the seat pad.

5. The juvenile stroller of claim 2, wherein each of the first and second side belts is separated from the backrest of the seat back by passing a companion backrest-anchor plate first in a forward direction through a companion belt-receiving aperture formed in the backrest of the seat back and then in a forward direction through a companion belt-receiving aperture formed in the backrest of the seat pad.

\* \* \* \* \*